United States Patent
Kim et al.

(10) Patent No.: US 8,442,582 B2
(45) Date of Patent: May 14, 2013

(54) MOBILE COMMUNICATION TERMINAL AND METHOD OF CONTROLLING BROADCAST OUTPUT THEREOF

(75) Inventors: Seong Nam Kim, Suwon-si (KR); Su Yeon Hwang, Gwangmyeong-si (KR); Jin Sun Shim, Bucheon-si (KR); Jong Hyan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1087 days.

(21) Appl. No.: 11/972,480

(22) Filed: Jan. 10, 2008

(65) Prior Publication Data

US 2008/0248832 A1    Oct. 9, 2008

(30) Foreign Application Priority Data

Apr. 5, 2007    (KR) .................. 10-2007-0033823

(51) Int. Cl.
    *H04M 1/00*    (2006.01)
(52) U.S. Cl.
    USPC ............... 455/556.1; 455/556; 455/569.1
(58) Field of Classification Search .......... 455/556.1, 455/569.1, 556
    See application file for complete search history.

(56) References Cited

U.S. PATENT DOCUMENTS

| | | | | |
|---|---|---|---|---|
| 4,959,735 | A * | 9/1990 | Kawai | 386/230 |
| 6,459,906 | B1 * | 10/2002 | Yang | 455/556.1 |
| 2001/0029196 | A1 * | 10/2001 | Wakamatsu | 455/574 |
| 2003/0236811 | A1 * | 12/2003 | Green et al. | 709/100 |
| 2004/0204020 | A1 | 10/2004 | Kuramitsu | |
| 2005/0070327 | A1 * | 3/2005 | Watanabe | 455/552.1 |
| 2007/0183744 | A1 | 8/2007 | Koizumi et al. | |

FOREIGN PATENT DOCUMENTS

| | | |
|---|---|---|
| CN | 1878214 A | 12/2006 |
| EP | 1398947 A2 | 3/2004 |
| EP | 1724955 A2 | 11/2006 |
| EP | 1777848 A2 | 4/2007 |
| JP | 2003-111004 A | 4/2003 |
| JP | 2005-253017 A | 9/2005 |

* cited by examiner

*Primary Examiner* — Edward Urban
*Assistant Examiner* — Hsin-Chun Liao
(74) *Attorney, Agent, or Firm* — Birch, Stewart, Kolasch & Birch, LLP

(57) ABSTRACT

A mobile communication terminal and method of controlling a broadcast output thereof are discussed, by which the broadcast output can be controlled by terminating the broadcast output in case that a call signal is received by the mobile communication terminal in the course of a broadcast viewing. An embodiment of the present invention includes receiving a call signal in the course of a broadcast program output and ending the broadcast program output in response to the received call.

11 Claims, 9 Drawing Sheets

MOBILE COMMUNICATION TERMINAL AND METHOD OF CONTROLLING BROADCAST OUTPUT THEREOF

This application claims the priority benefit of the Korean Patent Application No. 10-2007-0033823, filed on Apr. 5, 2007, which is hereby incorporated by reference as if fully set forth herein.

BACKGROUND OF THE INVENTION

1. Field of the Invention

The present invention relates to a mobile communication terminal, and more particularly, to a mobile communication terminal and method of controlling a broadcast output thereof. Although the present invention is suitable for a wide scope of applications, it is particularly suitable for controlling the broadcast output in case of receiving a call signal in the course of viewing a broadcast program.

2. Discussion of the Related Art

Generally, a mobile communication terminal moves around within a mobile communication service area to perform a phone call operation with a normal phone subscriber or another mobile communication terminal, mobile management for managing personal information, and information transaction with a personal computer.

Recently, a mobile communication terminal is provided with various functions such as a broadcast receiving function. So, a user is able to view such a broadcast program as a movie, news, a drams, a sports game, and the like using the mobile communication terminal having the broadcast receiving function.

However, in case that the mobile communication terminal receives a call signal in the course of a broadcast viewing, it may have a technical difficulty in handling an output of the currently viewed broadcast program. So, many efforts have been made to research and develop a method of controlling the output of the currently viewed broadcast program in case that a call signal is received in the course of the broadcast viewing.

SUMMARY OF THE INVENTION

Accordingly, the present invention is directed to a mobile communication terminal and method of controlling a broadcast output thereof that substantially obviate one or more problems due to limitations and disadvantages of the related art.

An object of the present invention is to provide a mobile communication terminal and method of controlling a broadcast output thereof, by which the broadcast output can be controlled by terminating the broadcast output in case that a call signal is received by the mobile communication terminal in the course of a broadcast viewing.

Another object of the present invention is to provide a mobile communication terminal and method of controlling a broadcast output thereof, by which if a call signal is received by the mobile communication terminal in the course of a broadcast viewing, the broadcast output is controlled in a manner of delaying the broadcast output.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a broadcast output in a mobile communication terminal according to an embodiment of the present invention includes receiving a call signal in the course of a broadcast program output and ending the broadcast program output.

In another aspect of the present invention, a method of controlling a broadcast output in a mobile communication terminal includes receiving a call signal in the course of a broadcast program output, connecting a call according to the call signal, selecting one of a call end, a call reservation, a broadcast program output end while the call is connected, and ending either the call or the broadcast program output according to a selection made by the selecting step or reserving the call.

In another aspect of the present invention, a method of controlling a broadcast output in a mobile communication terminal includes receiving a call signal in the course of a broadcast program output, holding the broadcast program output from a call connection timing point according to the call signal and storing a received broadcast program from the call connection timing point, simultaneously, and outputting the stored broadcast program or a real-time received broadcast program.

In a further aspect of the present invention, a mobile communication terminal includes an input unit for a key signal input, a wireless communication unit receiving a call signal and a broadcast program, an output unit outputting the received broadcast program, and a control unit, wherein if a call signal is received in the course of a broadcast program output, the control unit ends the broadcast program.

According to an embodiment, the present invention provides a method of controlling a broadcast output in a mobile communication terminal, comprising: receiving a call signal in the course of a broadcast program output; and ending the broadcast program output in response to the received call signal.

According to another embodiment, the present invention provides a method of controlling a broadcast output in a mobile communication terminal, comprising: receiving a call signal in the course of a broadcast program output; selecting one of a call end, a broadcast program output end, and a call and broadcast program output end in response to the received call signal; and ending at least one of the call and the broadcast program output according to the selection made in the selecting step.

According to another embodiment, the present invention provides a method of controlling a broadcast output in a mobile communication terminal, comprising: receiving a call signal in the course of outputting a broadcast program; in response to the received call signal, pausing the broadcast program output and storing the broadcast program from the pause point; and outputting the stored broadcast program or a real-time received broadcast program.

According to another embodiment, the present invention provides a mobile terminal comprising: a communication unit configured to receive a call signal and a broadcast program; an output unit configured to output the received broadcast program; and a control unit configured to control the output unit, wherein, if a call signal is received in the course of a broadcast program output, the control unit ends at least one of a call connection and the broadcast program output.

According to another embodiment, the present invention provides a mobile terminal comprising: a receiver configured to receive a call signal while the mobile terminal outputs a broadcast program; a controller configured to pause the broadcast program output and to store the broadcast program from the pause point in response to the received call signal; and an output unit configured to output the stored broadcast program or a real-time received broadcast program.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

First of all, a mobile communication terminal described in the specification can include an electronic device portable by a user. For instance, the electronic device can be, but is not limited to, a mobile phone, a digital broadcast terminal, an MP3 player, a PDA (personal digital assistant), a PMP (portable multimedia player), a smart device, a laptop computer, or the like.

Figure 1:
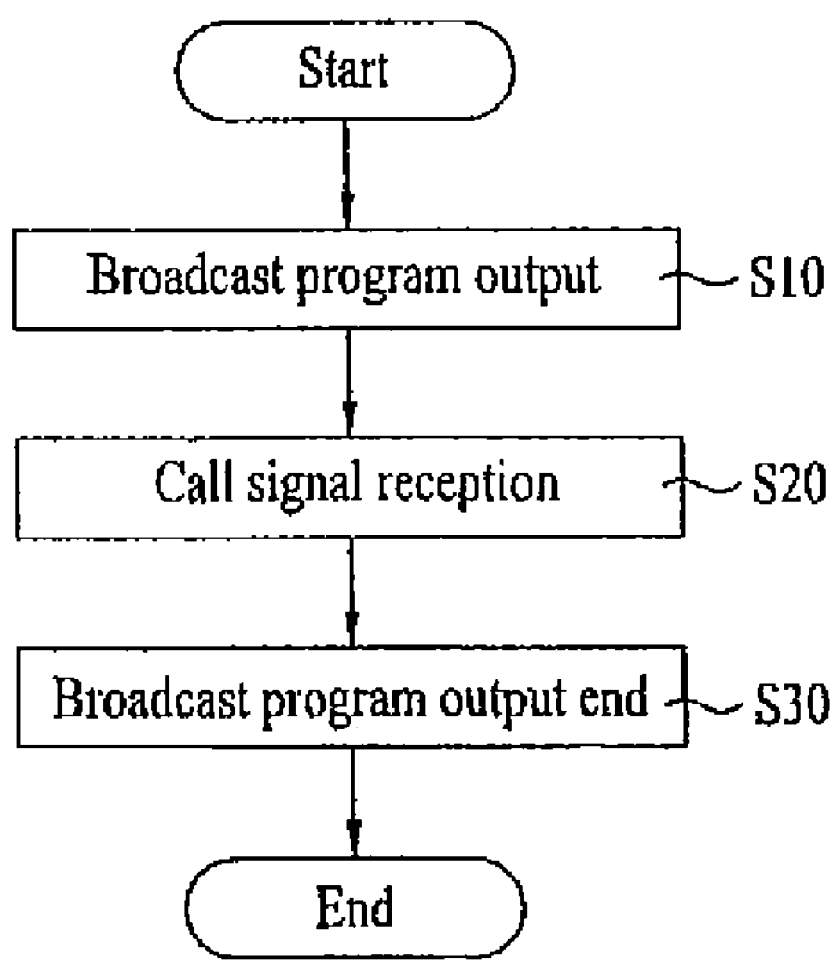
FIG. 1 is a flowchart of a method of controlling a broadcast output in a mobile communication terminal according to one embodiment of the present invention.
Figure 2:
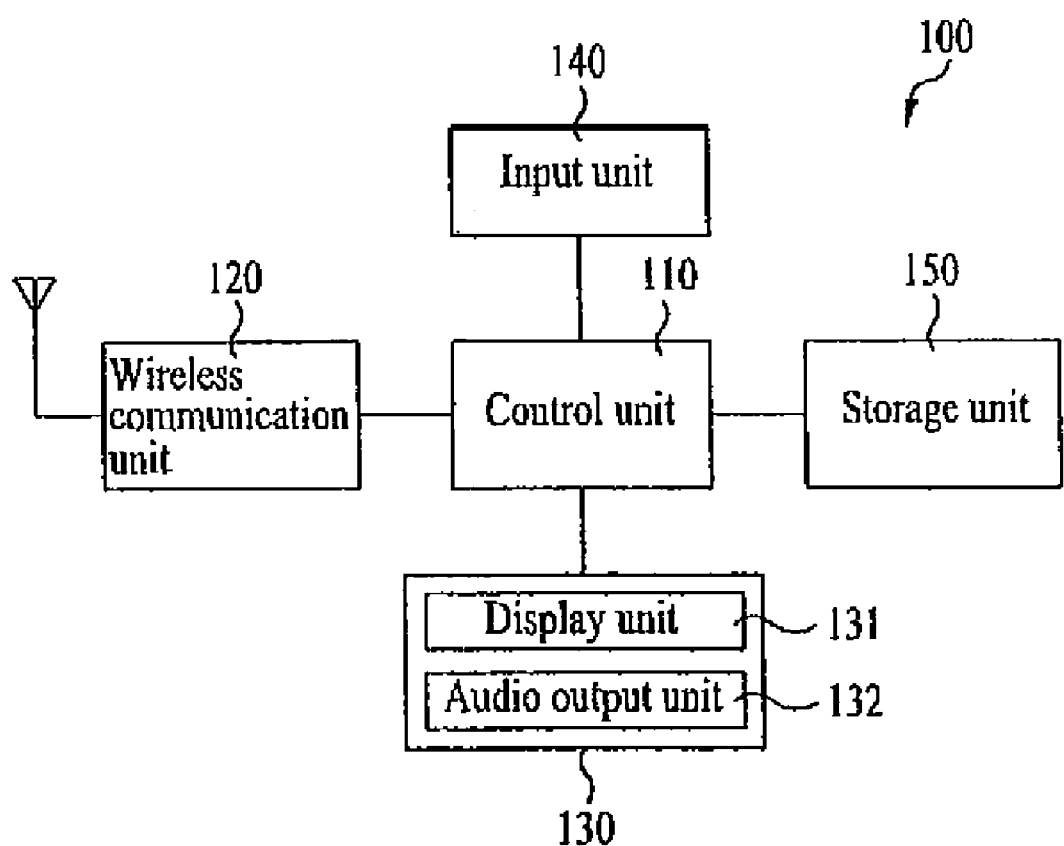
FIG. 2 is a block diagram of a mobile communication terminal according to one embodiment of the present invention.

FIG. 1 is a flowchart of a method of controlling a broadcast output in a mobile communication terminal according to one embodiment of the present invention, and FIG. 2 is a block diagram of a mobile communication terminal according to one embodiment of the present invention. The method of FIG. 1 is implemented by the mobile communication terminal 100, but can be implemented by other suitable device.

First of all, a mobile communication terminal 100 according to one embodiment of the present invention, as shown in FIG. 2, includes a control unit 110, a wireless communication unit 120, an output unit 130, an input unit 140, and a storage unit 150.

The mobile communication terminal 100 shown in FIG. 2 is just one embodiment of the present invention and does not put limitation on the present invention. Namely, to configure the mobile communication terminal of the present invention, the elements shown in the drawing can be omitted in part or new element(s) can be added according to implementation of the present invention. For instance, the mobile communication terminal 100 can include other components. All components of the mobile communication terminal 100 are operatively coupled and configured.

Referring to FIG. 1 and FIG. 2, the mobile communication terminal 100 can receive a broadcast signal including broadcast programs, related data (e.g., program guidance information, or information about the programs, etc.), etc. The received broadcast program is outputted via the output unit 130 of the mobile communication terminal 100 (S10). The output unit 130 includes a display unit 131 for outputting a video signal and an audio output unit 132 (e.g., speaker) for outputting an audio signal. In particular, the display unit 131 can include one or more screens, which can be one of LCD (liquid crystal display), PDP (plasma display panel), CRT (cathode ray tube), etc. Such screen(s) can be a touch screen through which the user can enter the user's input by touching the surface of the screen, and thus the display unit 131 can function as an input unit.

The mobile communication terminal 100 can receive the broadcast program via a channel assigned according to a frequency domain. And, the signal reception can be carried out via the wireless communication unit 120. The received broadcast program can be outputted via the output unit 130. In particular, a user is able to view the received broadcast program via the output unit 130, e.g., the display unit 131 and/or the audio output unit 132.

While the broadcast program is outputted through the output unit 130, a call signal can be received from a correspondent (another) mobile communication terminal referred to herein as the terminal X (S20). In this case, the user of the mobile communication terminal 100 is able to decide whether to perform a call connection according to the call signal from the terminal X or reject the call connection. This decision can be made through a key manipulation of the input unit 140 by the user and according to this decision, the mobile communication terminal 100 is able to perform a call connection or a call connection rejection. In this case, the user is also able to decide whether to end or sustain the outputted broadcast program.

Meanwhile, the above-explained key signal input can be carried out using a shortcut key. And, the shortcut key can be provided to the input unit 140 for the convenience of key signal manipulation.

The input unit 140 can include a keypad, a touch pad, a touch screen, or the like according to a configuration of the mobile communication terminal 100. In particular, if the input unit 140 includes the touch screen, the key manipulation of the input unit 140 can be carried out according to the way that the display unit 131 is touched.

So, in case of receiving a key signal relating to a broadcast program end for ending the broadcast program that is being currently displayed/outputted on/through the display unit 131 and/or audio output unit 132, the control unit 110 is able to end the outputting of the currently outputted broadcast program (S30).

In case of a call signal reception, there can exist various reasons for terminating the broadcast program that is currently outputted. For instance, in case that a broadcast program output and a phone call are simultaneously sustained, the outputted broadcast program can be ended to save a battery consumption.

In case that the broadcast program is ended, a corresponding end time can be decided as well. For instance, the user or the mobile communication terminal 100 can decide whether to end the outputting of the broadcast program before or after the completion of the call connection.

First of all, according to a first example of the invention, there is a method of ending the broadcast program output before the completion of the call connection according to the received call signal. This example is shown in FIG. 3.

Figure 3:
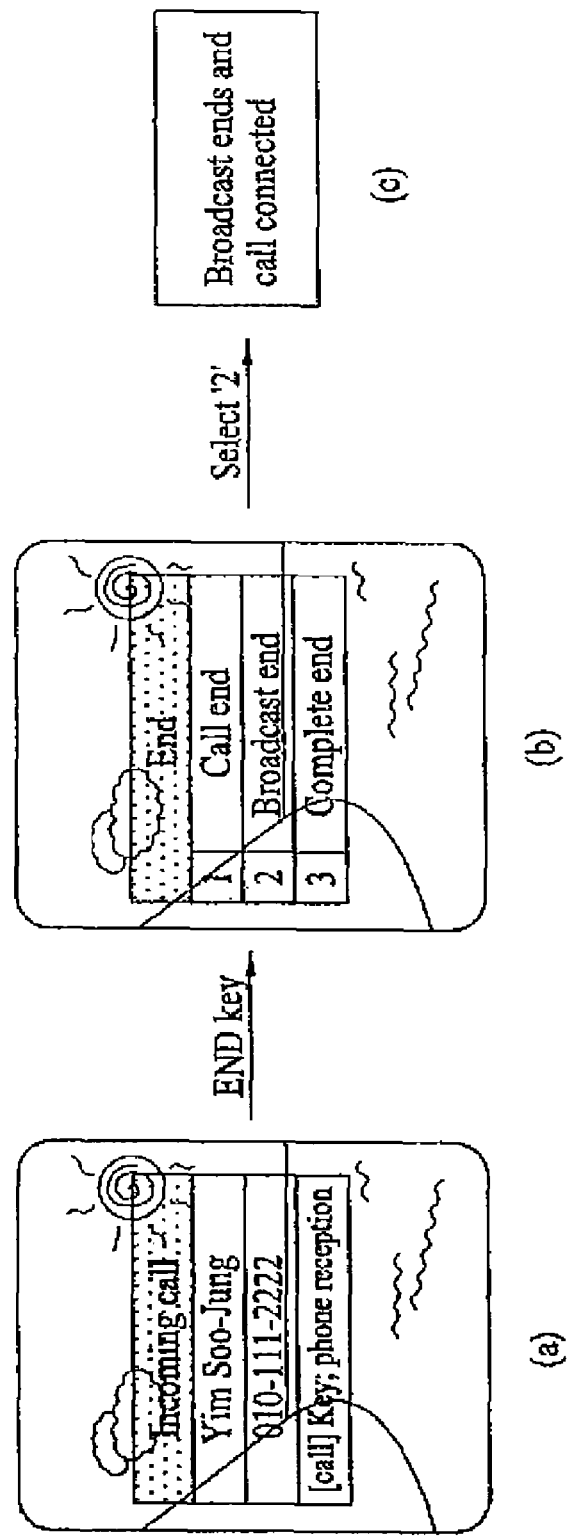
FIGS. 3 to 6 are diagrams to explain examples of a method of controlling a broadcast output in a mobile communication terminal in FIG. 1.

Referring to FIG. 3, while a broadcast program output is carried out (e.g., while the broadcast program is currently being displayed and/or outputted through the output unit 130, if a call signal is received, the control unit 110 can display an image, as shown in (a) of FIG. 3, on the display unit 131.

If a specific key signal, e.g., an 'END' key signal is inputted, an image, as shown in (b) of FIG. 3, for terminating the broadcast program output, for terminating the call, or for terminating the broadcast program and the call can be displayed. In the image shown in (b) of FIG. 3, selectable menu items such as 'Broadcast end' (broadcast program output end), 'Call end' (call connection rejection), and 'Complete end' (broadcast program output end and call connection rejection) are displayed on the screen of the mobile communication terminal 100.

In particular, in case of a call signal reception, at least one of the broadcast program output end and the call connection rejection can be selected. For instance, if the 'Broadcast end' corresponding to 'No. 2' is selected by the user, the broadcast program that is currently being outputted on the output unit 130 is ended and the call connection according to the call signal are executed, as shown in (c) of FIG. 3.

Secondly, according to a second example of the invention, there is a method of ending the broadcast program output after the completion of the call connection according to the received call signal. This example is shown in FIG. 4.

Figure 4:
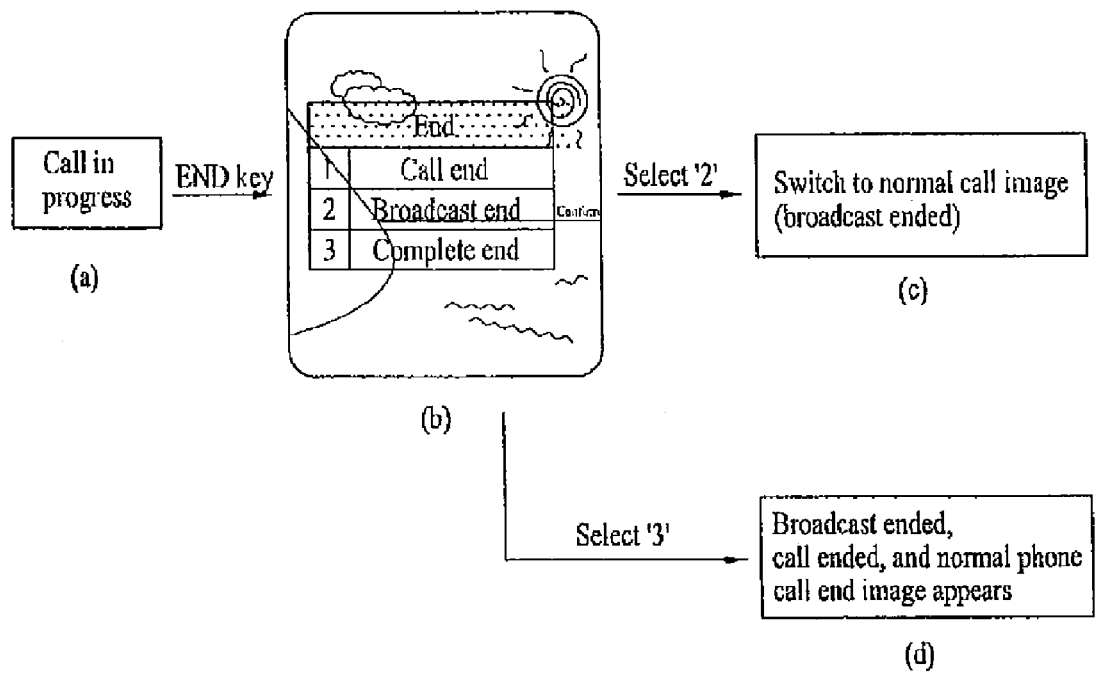

FIG. 4 shows a method of ending the outputting of a broadcast program after the completion of a call connection according to an embodiment of the present invention.

Referring to FIG. 4, while the output unit 130 is outputting a broadcast program (e.g., while the broadcast program is being displayed on the screen of the mobile terminal 100), if a call signal is received, the control unit 110 is able to execute a call connection as shown in (a) of FIG. 4.

While the above state (a) of FIG. 4 is maintained, if a specific key signals e.g., an 'END' key signal, is inputted, an image (e.g., a menu for ending the broadcast program output can be displayed) as shown in (b) of FIG. 4 is displayed on the screen (display unit 131) of the mobile terminal 100. In the image (b) of FIG. 4, selectable items such as 'Broadcast end' (broadcast program output end), 'Call end' (call connection rejection), and 'Complete end' (broadcast program output end and call connection rejection) are displayed on the screen of the mobile terminal 100.

For instance, if the item 'Broadcast end' (output end of broadcast program) corresponding to 'No. 2' is selected, the currently outputted broadcast program is ended and an image can be switched to a normal calling image as shown in (c) of FIG. 4. If 'No. 3' is selected, outputting of the broadcast program and the call connection are ended and an image can be switched to an end image of a (normal) phone call as shown in (d) of FIG. 4.

Meanwhile, according to one embodiment of the present invention, after the call is connected through the mobile terminal 100, in case that a specific situation takes place, the control unit 110 is able to end the currently outputted broadcast program and/or the call connection. As an example of the specific situation, there is a case that a prescribed time has passed from a call connection, a case that the battery of the mobile communication terminal 100 remains below a prescribed quantity, a case that the broadcast signal reception strength of the mobile communication terminal 100 is reduced below a prescribed strength, or the like.

And, the control unit 110 enables the user to recognize that the specific situation has taken place. Having recognized the situation, the user can input to end the currently outputted broadcast program and/or the current call connection. The control unit 110 is able to receive and implement the input of a key signal for the broadcast program output end and/or the call connection end.

As an alternative, if a specific situation takes place, the control unit 110 itself is able to automatically execute the broadcast program output end and/or the call connection end as needed.

Meanwhile, according to one embodiment of the present invention, if a specific situation takes place, a method of enabling a user to recognize the specific situation can exist in various ways.

Figure 5:
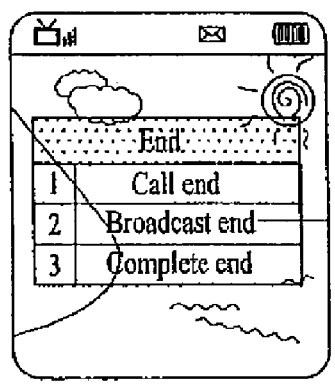

For instance, if the specific situation takes place, an image (e.g., menu) for selecting a broadcast program output end and/or a call connection end is displayed on the display unit 131. So, the user is able to recognize the specific situation. This example is shown in FIG. 5. Further, the nature of the specific situation (e.g., 'low battery') may also be specified and displayed on the display unit 131, e.g., using a text description, an icon, a pop-up window, etc. The control unit 110 can control the image shown in FIG. 5 to be displayed before a call connection.

And, a user can be informed of the specific situation occurrence by outputting an audio signal. As an example of the audio signal, a voice or alarm sound for announcing the situation occurrence and/or the nature of the specific situation can be used. The user can be informed of the specific situation occurrence via other means such as vibration. That is, the user can be notified of the occurrence of the specific situation and/or what the specific situation is via various ways, which the user can set according to the user's preference.

Figure 6:
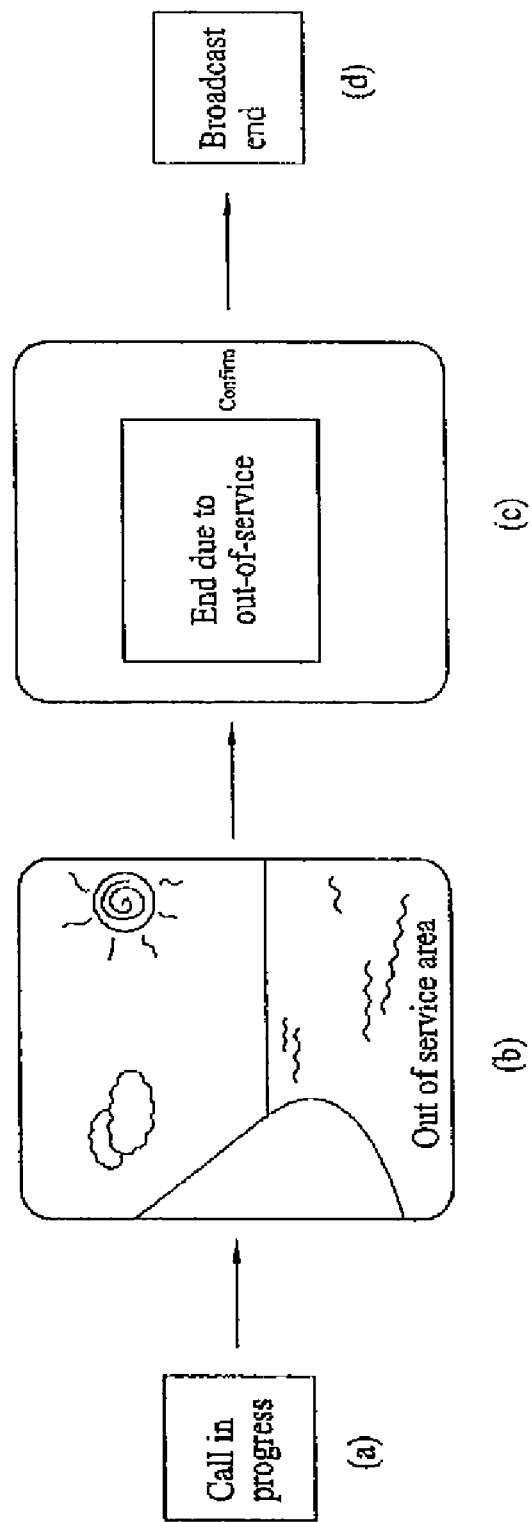

FIG. 6 shows an example where a broadcast program output is ended if a mobile communication terminal moves away into a shadow area or an area having a weak broadcast reception strength according to an embodiment of the present invention.

Referring to FIG. 6, while a call is in progress as shown in (a), if a mobile communication terminal (e.g., the mobile terminal 100) moves away from a service area, an image for 'Out of service area' is displayed on the display unit 131 as shown in (b). After a prescribed time has passed, a currently outputted broadcast program can be ended according to a user's selection or automatically as shown in (c) and (d) of FIG. 6.

Meanwhile, according to one embodiment of the present invention, if a call signal is received in the course of a broadcast program output, the mobile terminal 100 is able to select one of a broadcast end, a call end, and a broadcast reserve (reservation such as recording the currently outputted broadcast). This can be executed according to the call signal while the call is connected. And, a prescribed function can be executed in correspondence to the selection of one of the broadcast end, call end and broadcast reserve.

The mobile communication terminal 100 according to one embodiment of the present invention is able to inform a user of the occurrence of a specific situation for the selection. As an example of the specific situation, there is a case that a prescribed time has passed from a call connection, a case that a battery of the mobile communication terminal 100 remains below a prescribed quantity, a case that a broadcast signal reception strength of the mobile communication terminal 100 is reduced below a prescribed strength, or the like.

In case that the specific situation takes place, a method of informing a user of the specific situation occurrence can exist in various ways as discussed above. For instance, if the specific situation takes place, the control unit 110 is able to display an image for selecting one of the call end, call reserve (e.g., call taking, call waiting, etc.), and the broadcast program output end on the display unit 131. And, the user can be informed of the specific situation occurrence from the outputted audio signal. As mentioned above, an example of the audio signal can be a voice or alarm sound for announcing the situation occurrence. Moreover, the user can be informed of the specific situation occurrence via vibration.

Explained in the following description is a method of giving a pause to a broadcast program if a call signal is received in the course of outputting the broadcast program that is being received.

Figure 7:
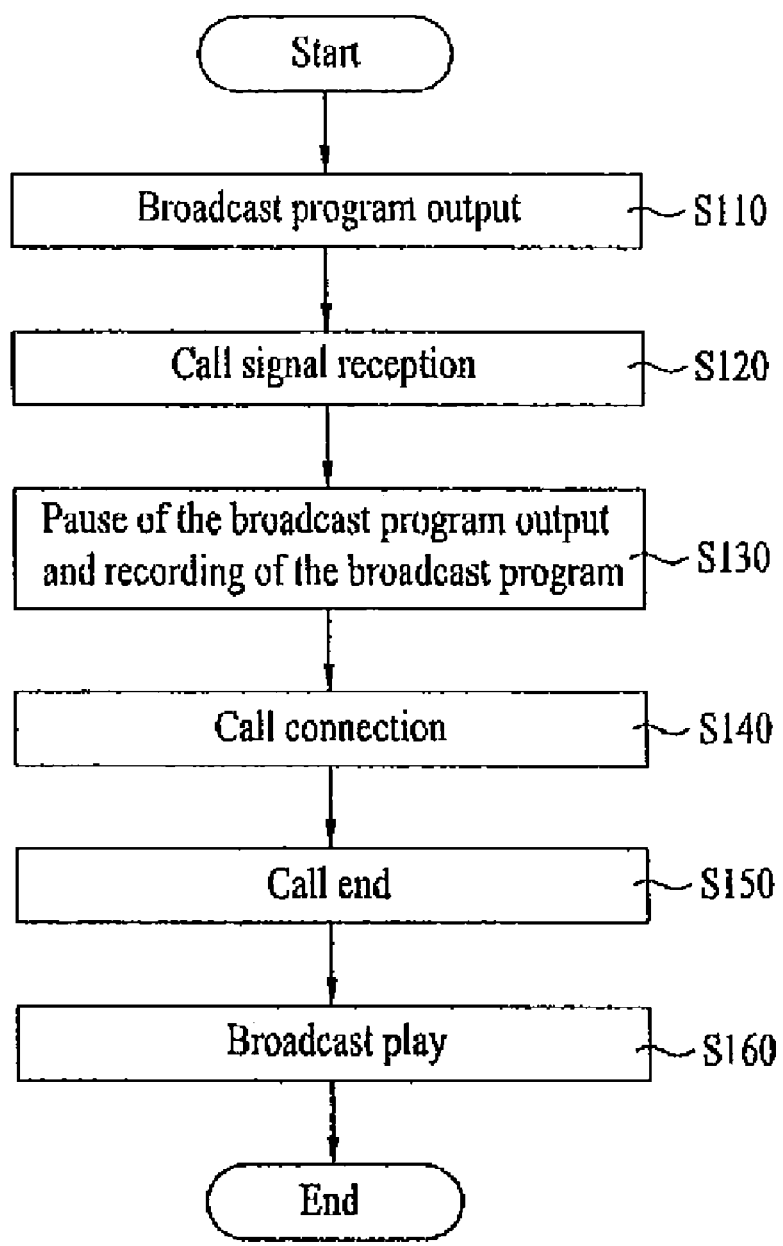
FIG. 7 is a flowchart of a method of controlling a broadcast output in a mobile communication terminal according to another embodiment of the present invention.

FIG. 7 is a flowchart of a method of controlling a broadcast output in a mobile communication terminal according to another embodiment of the present invention. The method of FIG. 7 is discussed below as being implemented in the mobile communication terminal 100 as an example only, but can be implemented in other terminals.

Referring to FIG. 7, the mobile communication terminal 100 receives a broadcast signal including a broadcast program, and the received broadcast program is outputted via the output unit 130 of the mobile communication terminal 100 (S110). In this case, the reception of the broadcast program can be carried out by the wireless communication unit 120. The received broadcast program is outputted via the output unit 130.

So, a user is able to view and/or hear the received broadcast program via the output unit 130.

In the course of this broadcast program output, a call signal can be received from a correspondent mobile communication terminal X (S120). In this case, the user is able to decide whether to execute a call connection according to the call signal or reject the call connection. And, this can be carried out by a key manipulation of the input unit 140.

In case that the call is connected according to the call signal, the control unit 110 controls the output unit 130 to be able to give a pause to the broadcast program output. In this case, the control unit 110 is able to store or record the received broadcast program in the storage unit 150 from the timing point (pause point) at which the received program has been paused (S130). This is to enable a user to view the stored program later, if desired, by storing the broadcast program received after the pause. Namely, according to one embodiment of the present invention, the pause of the received broadcast program output and the recording of the broadcast program from the pause point can be simultaneously and/or automatically carried out.

Subsequently or while the broadcast program is being recorded after the pause point, the control unit 110 is able to establish a call connection according to the received call signal (S140). Of course, the present invention can include the simultaneous executions of both steps S130 and S140. In particular, in case that a broadcast program output delay mode is preset, step S130 can be executed as soon as the call connection is established. Steps S130 or S140 can be executed using a shortcut key of the input unit 140.

According to an embodiment of the present invention, the 'broadcast program output delay mode' means a function or status wherein both a broadcast program output pause and a broadcast program recording can be simultaneously carried out.

Figure 8:
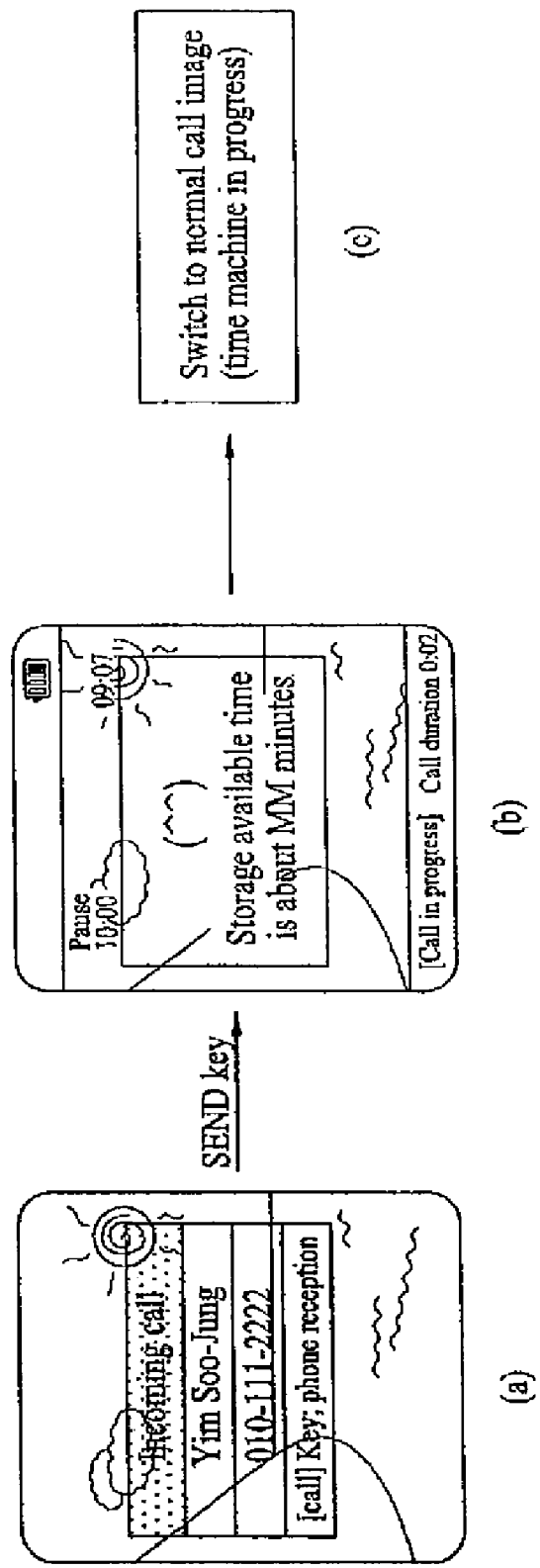
FIGS. 8 to 10 are diagrams to explain examples of a method of controlling a broadcast output in a mobile communication terminal in FIG. 7.

Meanwhile, in step S130, after the call signal is received as shown in (a) of FIG. 8, the control unit 110 is able to display at least one of a time available for storing the broadcast program and the remaining quantity of the battery of the mobile communication terminal, which is shown in (b) of FIG. 8. Then a call image is displayed on the screen of the mobile terminal 100 as shown in (c) of FIG. 8. The time available for storing the broadcast program can indicate the current available storage space of the storage unit 150 or the time length (e.g., in minutes) of the broadcast program which can be stored in the storage unit 150. Based on this indication, the user can vary the length of the user's call according to the indication, if desired.

Further, the time available for storing the broadcast program and the remaining battery quantity of the mobile communication terminal can be indicated by outputting audio signals. And, the audio signals can be outputted via the audio output unit 132.

Figure 9:
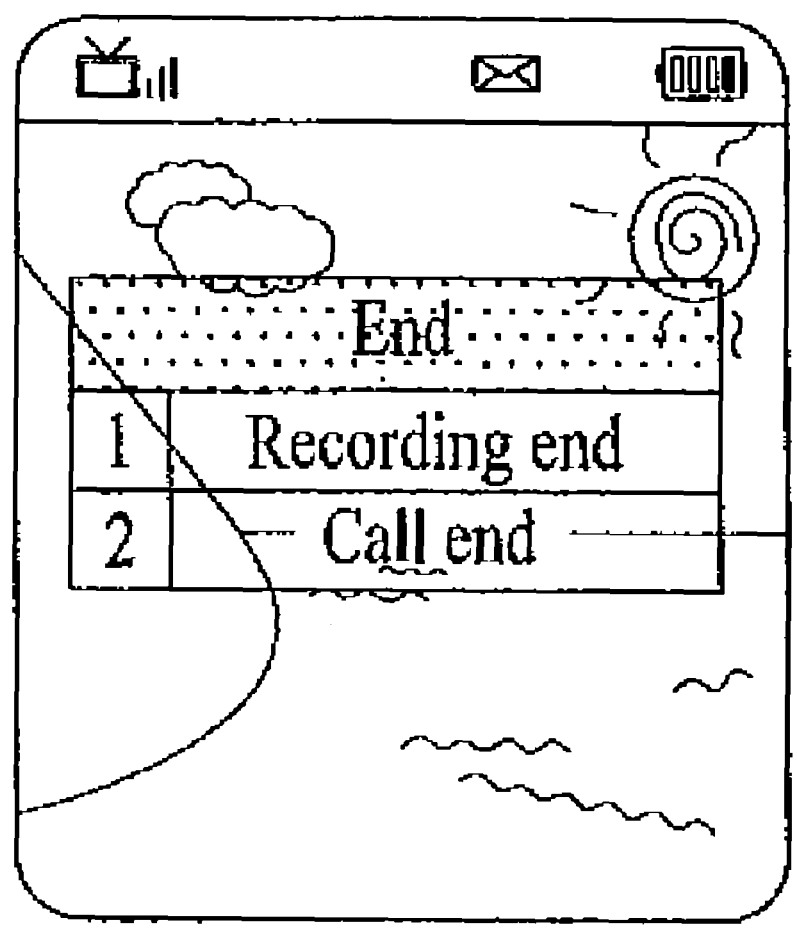

While the call connection is established, in case that the remaining battery quantity of the mobile communication terminal 100 is below a prescribed quantity level, a popup window for selecting at least one of the broadcast program storage end and the call connection end can be displayed. This example is shown in FIG. 9. In the drawing, 'Recording end' means the broadcast program storage end.

Meanwhile, if the call connection is released (or ends), the control unit 110 is able to continue to play the broadcast program (S150, S160). In this case, the played broadcast program includes the stored broadcast program or a real-time received broadcast program. For instance, at step S160, the outputting of the broadcast program is resumed by reproducing the stored broadcast program from the storage unit 150 or reproducing a received broadcast program in real time, or a combination thereof.

In this regard, the control unit 110 is able to display an item for selecting one of the two broadcast programs (the stored broadcast program and the real-time received broadcast program) on the display unit 131. This example is shown in FIG. 10.

Figure 10:
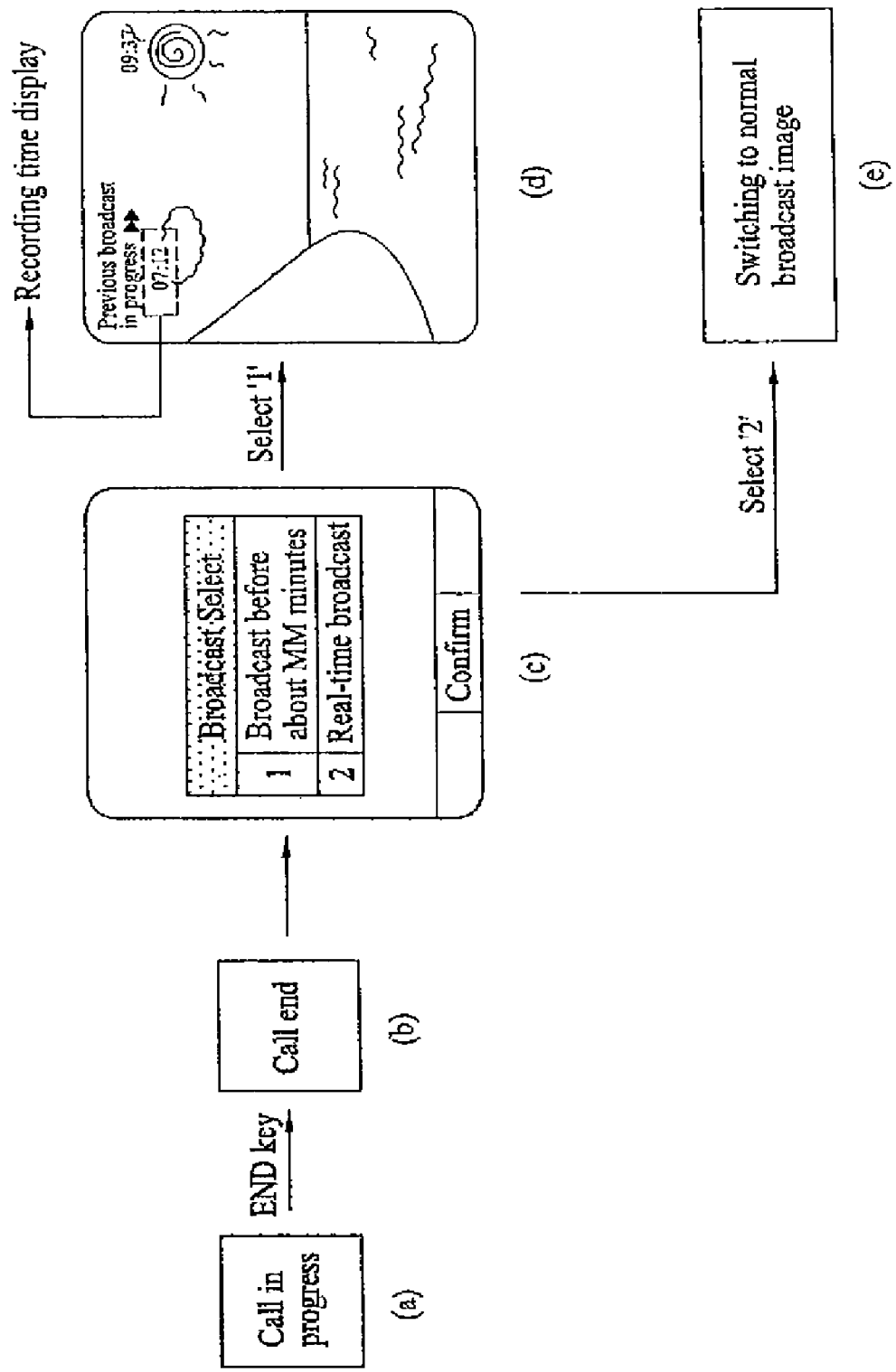

Referring to FIG. 10, if the call connection is released (e.g., at step S150 of FIG. 7) as shown in (a) and (b) of FIG. 10, an image for a broadcast selection is displayed on the display unit 131 as shown in (c) of FIG. 10. If 'No. 1' is selected, the stored broadcast program is played back via the output unit 130 as shown in (d) of FIG. 10. If 'No. 2' is selected, the real-time received broadcast program is played via the output unit 130 as shown in (e) of FIG. 10.

Meanwhile, according to one embodiment of the present invention, in case that the stored broadcast program is played back, the corresponding play speed can be adjusted.

In case that the stored broadcast program is played back, the control unit 110 can erase the stored broadcast program from the storage unit 150 in the order in which the broadcast program is outputted. For instance, once the stored broadcast program is played back, it may be unnecessary to keep the stored broadcast program in the mobile communication terminal 100 and thus, the stored broadcast program can be removed/erased.

Step S160 can be executed if a broadcast program output request is made or as soon as the call connection ends.

In the above embodiments, the mobile terminal 100 can be configured to display at least one menu or button for making the selection(s) and/or settings discussed herein. For instance, an image or menu can be displayed on the screen of the mobile terminal for generating the specific situation occurrence and/or the nature of the specific situation either audibly or through vibration.

Accordingly, the present invention provides the following effects or advantages.

First of all, in case that a call signal is received in the course of a broadcast program output, the present invention is able to effectively control the broadcast program output.

Secondly, in case that a call signal is received in the course of a broadcast viewing, the present invention is able to control a broadcast output of a mobile communication terminal by ending the corresponding broadcast output.

Thirdly, in case that a call signal is received in the course of a broadcast program output, the present invention is able to delay the corresponding broadcast output.

Fourth, in case that a call signal is received in the course of a broadcast program output, the present invention is able to pause the corresponding broadcast output and record the corresponding broadcast program from the pause point for reproduction at a later time.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a broadcast output in a mobile communication terminal, comprising:
    receiving a call signal in the course of a broadcast program output;
    displaying, by the mobile communication terminal, a notification of the received call signal;
    if a first command is received while the notification is displayed, establishing a call connection in response to the call signal and ending the broadcast program output; and
    if a second command is received while the notification is displayed, displaying a menu window including at least one of a first menu for ending the broadcast program output, a second menu for rejecting the call signal and a third menu for ending both the broadcast program output and the received call signal,
    wherein when the first menu is selected, the call connection is established and the broadcast program output is ended,
    when the second menu is selected, the call connection is not made and the broadcast output is continuously outputted,
    when the third menu is selected, the broadcast program output and the call signal are ended, and
    the menu window displaying step is automatically executed if the call signal is received in a status that a battery quantity of the mobile communication terminal is below a prescribed level.

2. The method of claim 1, wherein the broadcast program output ending step is executed before the call connection according to the received call signal, if the first command is received while the notification is displayed.

3. The method of claim 1, wherein the broadcast program output ending step ends the broadcast program output while the call connection is established according to the call signal, if the first command is received while the notification is displayed.

4. The method of claim 1, wherein the broadcast program output ending step is executed together with a call connection end.

5. The method of claim 1, wherein the broadcast program output ending step is executed according to at least one selected from the group consisting of (i) a case that a prescribed time has passed while the call connection is established, (ii) a case that the battery quantity of the mobile communication terminal is below the prescribed level, and (iii) a case that a broadcast signal reception strength of the mobile communication terminal is below a prescribed level.

6. The method of claim 1, wherein the broadcast program output ending step is executed automatically in response to the received call signal or according to a user's selection.

7. The method of claim 1, further comprising:
    displaying an image for a broadcast program output end selection or generating at least one of an audio signal and a vibration for the broadcast program output end selection if the ending of the broadcast program output is executed by the broadcast program output end selection.

8. The method of claim 1, further comprising:
    displaying an item for selecting to end the broadcast program output and/or the status of battery quantity.

9. A mobile terminal comprising:
    a communication unit configured to receive a call signal and a broadcast program;
    an output unit configured to output the received broadcast program; and
    a control unit configured to control the output unit,
    wherein, if the call signal is received in the course of a broadcast program output, the control unit displays a notification of the received call signal via the output unit,
    if a first command is received while the notification is displayed, the control unit establishes a call connection in response to the call signal and ends the broadcast program output,
    if a second command is received while the notification is displayed, the control unit displays a menu window via the output unit including at least one of a first menu for ending the broadcast program output, a second menu for rejecting the call signal and a third menu for ending both the broadcast program output and the received call signal,
    wherein when the first menu is selected, the call connection is established and the broadcast program output is ended,
    when the second menu is selected, the call connection is not made and the broadcast output is continuously outputted,
    when the third menu is selected, the broadcast program output and the call signal are ended, and
    the control unit automatically displays the menu window if the call signal is received in a status that a battery quantity of the mobile terminal is below a prescribed level.

10. The mobile terminal of claim 9, wherein the control unit ends the broadcast program before or after the call connection according to the received call signal, if the first command is received while the notification is displayed.

11. The mobile terminal of claim 9, wherein the control unit ends the broadcast program output as soon as the call connection ends.

* * * * *